US009924830B1

(12) United States Patent
Glucksman et al.

(10) Patent No.: US 9,924,830 B1
(45) Date of Patent: Mar. 27, 2018

(54) COUNTERTOP COOKING APPLIANCE

(71) Applicant: Team International Group of America Inc., Miami Gardens, FL (US)

(72) Inventors: Dov Z. Glucksman, Winchester, MA (US); Nolan Lewis, Epsom, NH (US); Uri Murad, Aventura, FL (US); Doron Topaz, Aventura, FL (US)

(*) Notice: Subject to any disclaimer, the term of this patent is extended or adjusted under 35 U.S.C. 154(b) by 0 days.

(21) Appl. No.: 15/470,977

(22) Filed: Mar. 28, 2017

Related U.S. Application Data

(63) Continuation of application No. 62/427,632, filed on Nov. 29, 2016.

(51) Int. Cl.
| A47J 37/10 | (2006.01) |
| A47J 37/06 | (2006.01) |
| F24C 7/04 | (2006.01) |
| A47J 27/00 | (2006.01) |
| A47J 36/00 | (2006.01) |
| F24C 7/10 | (2006.01) |
| F24C 15/18 | (2006.01) |

(52) U.S. Cl.
CPC ......... *A47J 37/0623* (2013.01); *A47J 27/002* (2013.01); *A47J 36/00* (2013.01); *A47J 37/0611* (2013.01); *A47J 37/103* (2013.01); *F24C 7/043* (2013.01); *F24C 7/105* (2013.01); *F24C 15/18* (2013.01); *A47J 37/0635* (2013.01)

(58) Field of Classification Search
None
See application file for complete search history.

(56) References Cited

U.S. PATENT DOCUMENTS

| 2,036,523 | A | * | 4/1936 | Freemon | A47J 37/00 |
| | | | | | 219/452.13 |
| 2,693,750 | A | * | 11/1954 | Badenoch | A47J 37/0623 |
| | | | | | 126/299 C |
| 2,711,684 | A | * | 6/1955 | Taylor | A47J 37/0611 |
| | | | | | 219/450.1 |
| 3,393,295 | A | * | 7/1968 | Jepson | A47J 27/004 |
| | | | | | 219/386 |
| 4,178,500 | A | * | 12/1979 | Brindopke | A47J 37/0611 |
| | | | | | 219/386 |
| 4,889,972 | A | | 12/1989 | Chang | |
| 5,380,986 | A | | 1/1995 | Mullen | |

(Continued)

*Primary Examiner* — Joseph M Pelham
(74) *Attorney, Agent, or Firm* — Frank Marino

(57) ABSTRACT

A counter top cooking appliance has an enclosure defining a cooking chamber arranged to receive a cooking pan. The cooking chamber includes a lower heating element arranged so that the cooking pan may be supported thereon to receive conductive heating there-from, and an upper heating element disposed above and spaced from the cooking pan to provide radiant heating to food there-within. The enclosure includes an upper portion including the upper heating element, and a lower portion including the lower heating element, and a hinge connecting the upper portion to the lower portion. The hinge enables the upper portion to rest atop the lower portion to define the cooking chamber, and alternatively enables the upper portion to be swung relative to the lower portion so that the upper and lower portions are in a parallel side-by-side relationship and both heating elements are arranged so that the cooking pan may be supported on either thereof to receive conductive heating there-from.

18 Claims, 10 Drawing Sheets

(56) References Cited

U.S. PATENT DOCUMENTS

| | | | |
|---|---|---|---|
| 5,504,295 A | 4/1996 | Collas | |
| 5,586,488 A | 12/1996 | Liu | |
| 5,695,668 A * | 12/1997 | Boddy | F24C 7/087 |
| | | | 126/21 A |
| 5,708,255 A * | 1/1998 | Lamanna | A47J 37/0635 |
| | | | 219/385 |
| 6,062,130 A * | 5/2000 | Brady | A47J 37/0611 |
| | | | 219/386 |
| 6,111,226 A | 8/2000 | Lee | |
| 6,114,663 A * | 9/2000 | Stockley | A47J 37/0623 |
| | | | 219/398 |
| 6,271,504 B1 * | 8/2001 | Barritt | A47J 37/0623 |
| | | | 126/211 |
| 6,355,914 B1 * | 3/2002 | Stockley | A47J 37/0623 |
| | | | 219/398 |
| 6,593,552 B1 * | 7/2003 | Li | A47J 37/0623 |
| | | | 219/386 |
| 6,852,953 B1 * | 2/2005 | Lee | A47J 37/0629 |
| | | | 219/386 |
| 6,910,248 B2 | 6/2005 | Fiocco | |
| 7,053,337 B2 * | 5/2006 | Ragan | A47J 37/0611 |
| | | | 126/275 R |
| 7,060,941 B1 * | 6/2006 | Embury | F24C 15/327 |
| | | | 219/401 |
| 7,064,296 B1 * | 6/2006 | Harned | F24C 15/026 |
| | | | 126/190 |
| 7,285,751 B2 * | 10/2007 | Li | A47J 37/0629 |
| | | | 219/386 |
| 7,301,128 B2 * | 11/2007 | Li | A47J 36/38 |
| | | | 219/450.1 |
| 7,372,000 B2 * | 5/2008 | Stockley | F24C 15/16 |
| | | | 126/21 A |
| 7,960,673 B2 * | 6/2011 | Li | A47J 36/38 |
| | | | 219/450.1 |
| 8,484,805 B2 | 6/2013 | Munari | |
| D750,415 S * | 3/2016 | Marsh-Croft | D7/352 |
| 2002/0043529 A1 * | 4/2002 | Pickering | A47J 37/0623 |
| | | | 219/452.13 |
| 2012/0060821 A1 * | 3/2012 | McNamee | E05D 15/46 |
| | | | 126/197 |
| 2015/0033956 A1 * | 2/2015 | Fung | A47J 36/36 |
| | | | 99/390 |
| 2015/0053093 A1 * | 2/2015 | Chang | A47J 37/0807 |
| | | | 99/341 |

* cited by examiner

US 9,924,830 B1

COUNTERTOP COOKING APPLIANCE

RELATED APPLICATIONS

This application claims priority to U.S. Provisional Application No. 62/427,632, filed on 29 Nov. 2016, the entire teachings of which are incorporated herein by reference.

FIELD OF THE INVENTION

The invention related to cooking of food. More specifically, the invention relates to electrical appliances for cooking food and for methods of cooking food therewith.

BACKGROUND

Numerous methods exist for cooking food. Three of the most common ways of those are; placing the food in a cooking pan such as a frying pan or a pot which are heated by placing them on a stovetop heater, gas or electric; placing the food on a tray in an oven where the entire oven cavity is heated, electrically or by gas flame; exposing the food to radiant heat, which can be fueled by gas, charcoal or electric.

Cooking on a stove top is relatively fast because of the direct heat transfer from the heat source through the cooking pan bottom into the food. In this method where the food is being heated from the bottom it must be stirred occasionally or flipped over to be cooked thoroughly.

Cooking in an oven takes much longer because there is no immediate heat transfer from the heaters to the food. The advantage is though that in most cases the food does not have to be stirred or flipped because the heat is provided from all directions.

Using radiant heat offers relatively fast heat transfer, but is only suitable for certain modes of food preparations, such as grilling and barbequing.

Disclosed herein is an apparatus that combines the speed of cooking on a stovetop with the added benefit of not having to stir or flip the food.

SUMMARY OF THE INVENTION

The invention may be embodied in or practiced using a counter top cooking appliance having an enclosure defining a cooking chamber arranged to receive a cooking pan, wherein the cooking chamber includes a lower heating element arranged so that the cooking pan may be supported thereon to receive conductive heating there-from, and an upper heating element disposed above and spaced from the cooking pan to provide radiant heating to food there-within.

The enclosure may have an upper portion including the upper heating element, and a lower portion including the lower heating element, and a hinge connecting the upper portion to the lower portion; the hinge enabling the upper portion to rest atop the lower portion to define the cooking chamber, and alternatively enabling the upper portion to be swung relative to the lower portion so that the upper and lower portions are in a parallel side-by-side relationship and both heating elements are arranged so that the cooking pan may be supported on either thereof to receive conductive heating there-from, or so that two cooking pans may be supported there-on to receive conductive heating there-from.

The upper and lower heating elements may be arranged to allow different heating levels. At least one of the heating elements may be selectively controllable to cause the different heating levels. The appliance may further include a programmable controller to cause the different heating levels in accordance with a recipe program. The programmable controller may cause the different temperatures according to accumulated time and/or measured temperature. The appliance may further include a manual controller for use instead of or in conjunction with the programmable controller.

The appliance may include a door openable to allow insertion of the cooking pan into and removal of the pan from the cooking chamber, and closeable during cooking to retain heat within the cooking chamber. The door may be automatically openable by the programmable controller. The programmable controller may cause the door to open according to accumulated time and/or measured temperature.

The cooking pan may have a handle for enabling placement of the cooking pan into the cooking chamber; the handle being detachable from the cooking pan to enable closure of the door during cooking. The handle may re-attachable to the cooking pan for removal of the cooking pan from the cooking chamber.

The invention may alternatively be embodied in or practiced using a counter top cooking appliance having an enclosure defining a cooking chamber including a heating element; a programmable controller to energize the heating element in accordance with a recipe program, and a door openable to allow insertion of food into and removal of the food from the cooking chamber, and closeable during cooking to retain heat within the cooking chamber; wherein the door is automatically openable by the programmable controller.

The programmable controller may cause the door to open according to accumulated time and/or measured temperature. The programmable controller may cause different heating levels within the cooking chamber in accordance with the recipe program. The door may be openable and closeable electro-mechanically. The door may be openable and closeable by a permanent magnet DC electric motor and a gear train. The permanent magnet DC electric motor may be controlled by the programmable controller. One or more sensors may communicate with the programmable controller when the door is opened and/or closed.

Further features and aspects of the invention are disclosed with more specificity in the Detailed Description and Drawings provided herein and showing exemplary embodiments of the invention.

DETAILED DESCRIPTION OF THE DRAWINGS

An exemplary embodiment of a countertop cooking appliance in accordance with or useful in practicing the invention are shown in the accompanying Drawings, of which;

DESCRIPTION OF AN EXEMPLARY EMBODIMENT

Figure 1:
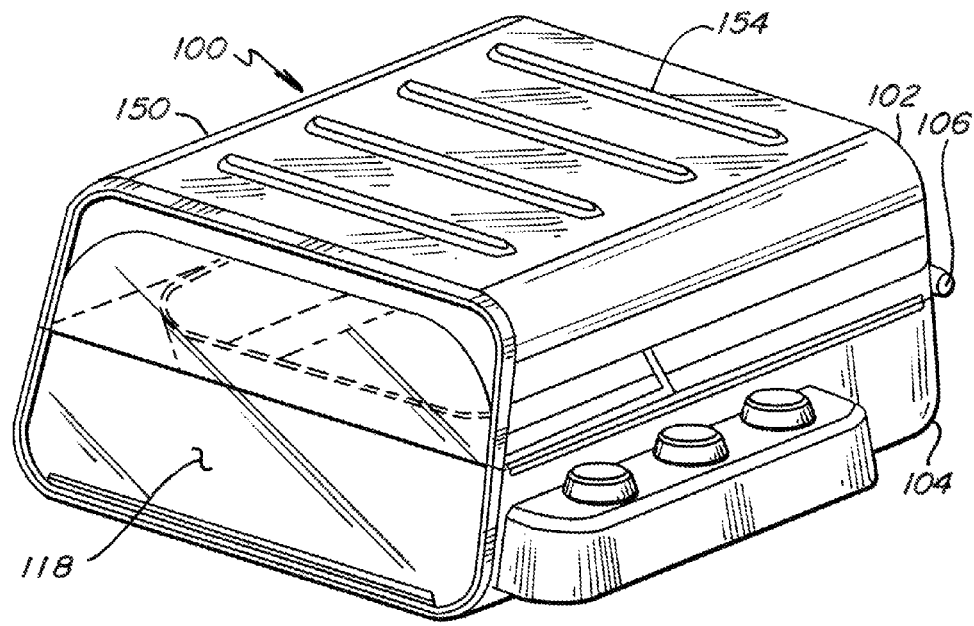
FIG. 1 is a perspective view of the appliance.

An exemplary countertop cooking appliance 100 in accordance with or useful in practicing the invention is depicted in the accompanying drawings and comprises an enclosure consisting of an upper portion 102 and a lower portion 104, held together by a hinge 106 located in the rear of the enclosure. Each of the enclosure portions includes an electric heating element, upper heating element 108 in the upper portion and lower heating element 110 in the lower portion.

The apparatus further comprises an access opening 114 through which a cooking pan 116 containing food may be inserted into the enclosure. The access opening has a door 118 hinged near its bottom end which is in a near horizontal position when food is inserted into the enclosure, as seen in FIGS. 2, 3, 5, and 7, and in a closed position when food is being cooked to minimize heat loss during the cooking process, as seen in FIGS. 1, 4, 6, 9, and 11.

Figure 10:
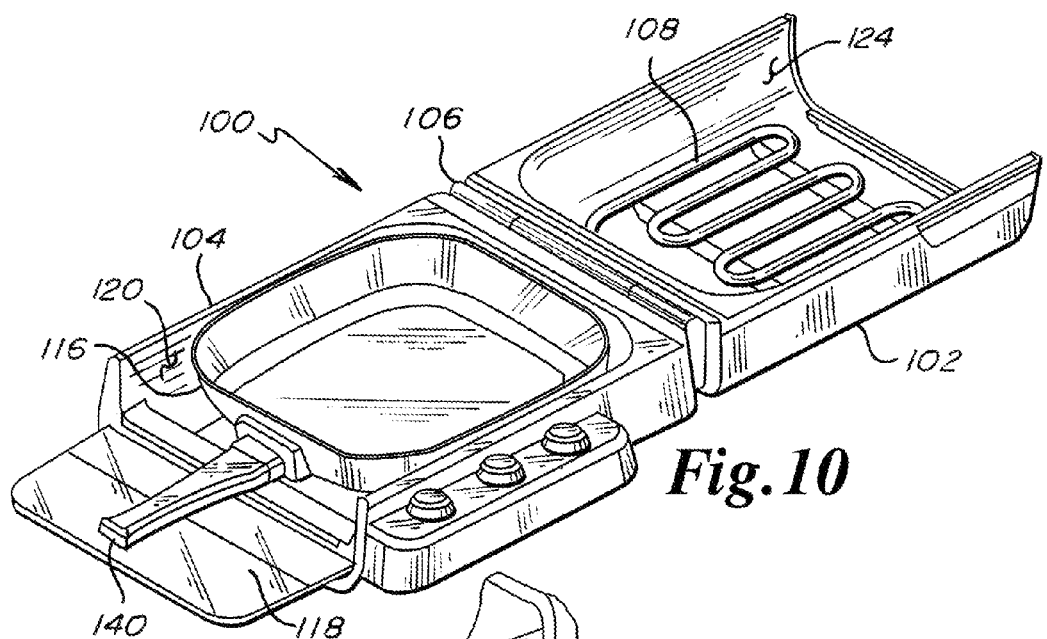
FIG. 10 is a perspective view of the appliance in its opened state.
Figure 12:
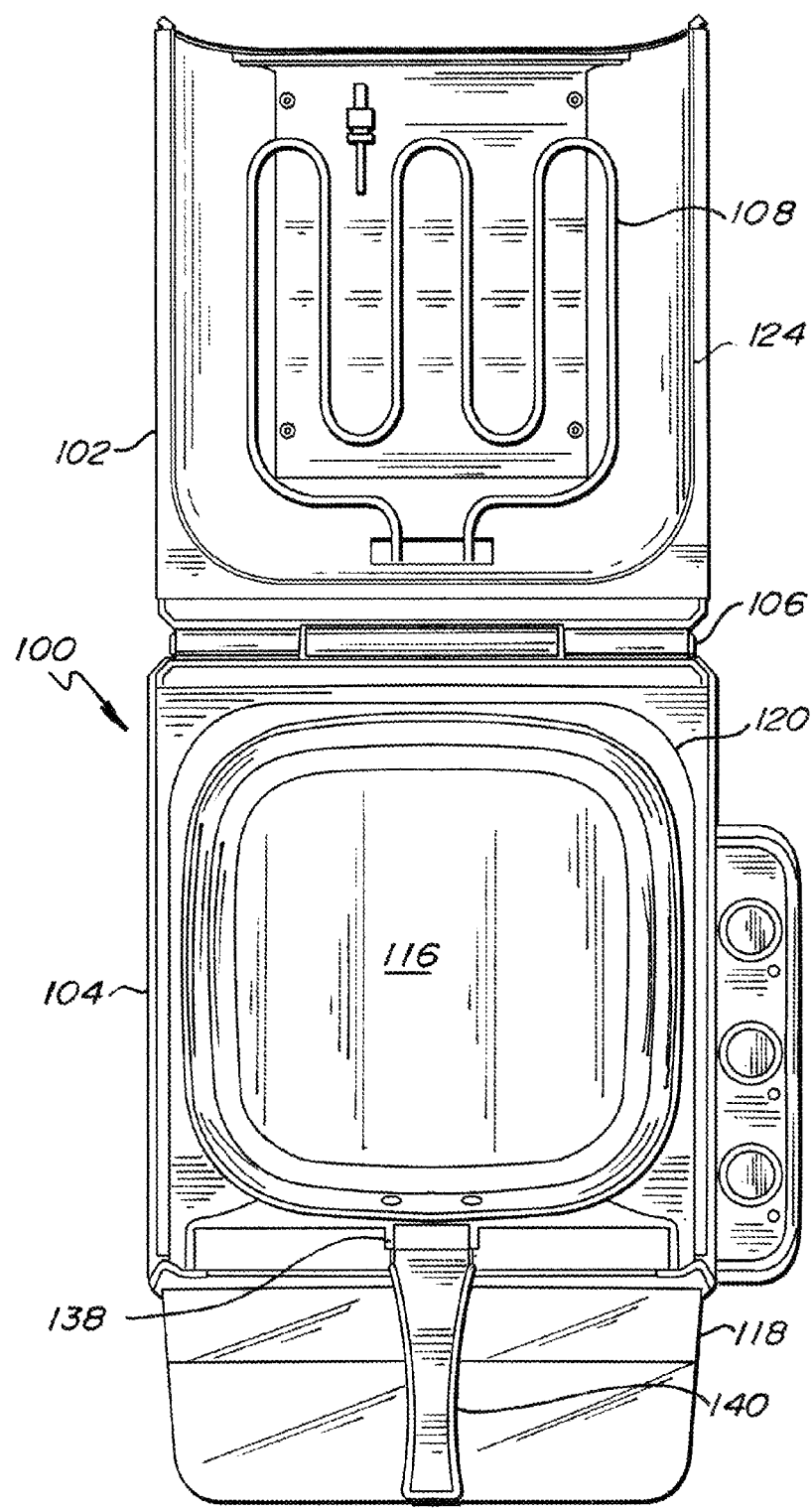
FIG. 12 is a top view of the appliance in its opened state.
Figure 15:
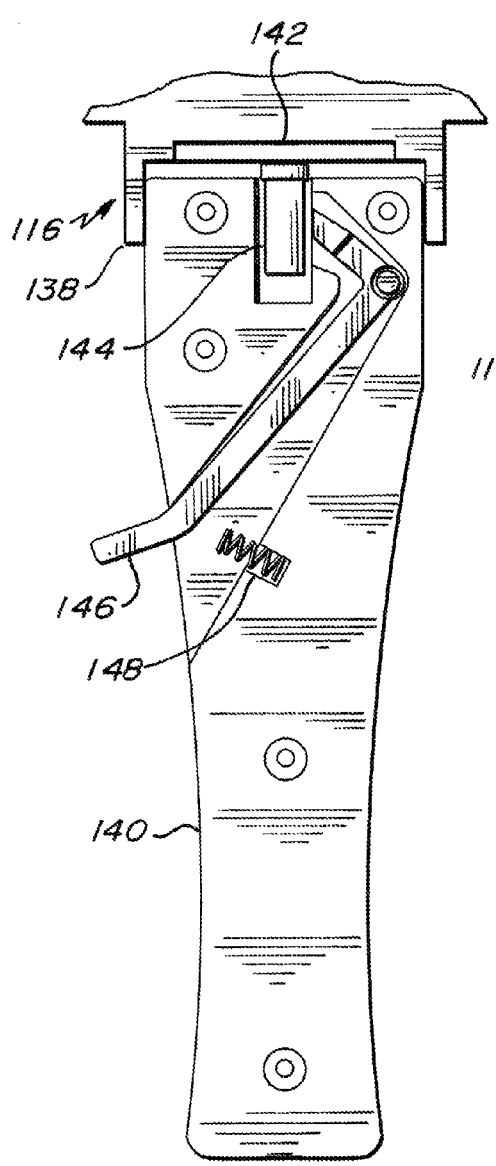
FIG. 15 is a top view of the removable pan handle of the appliance in its attached state.
Figure 17:
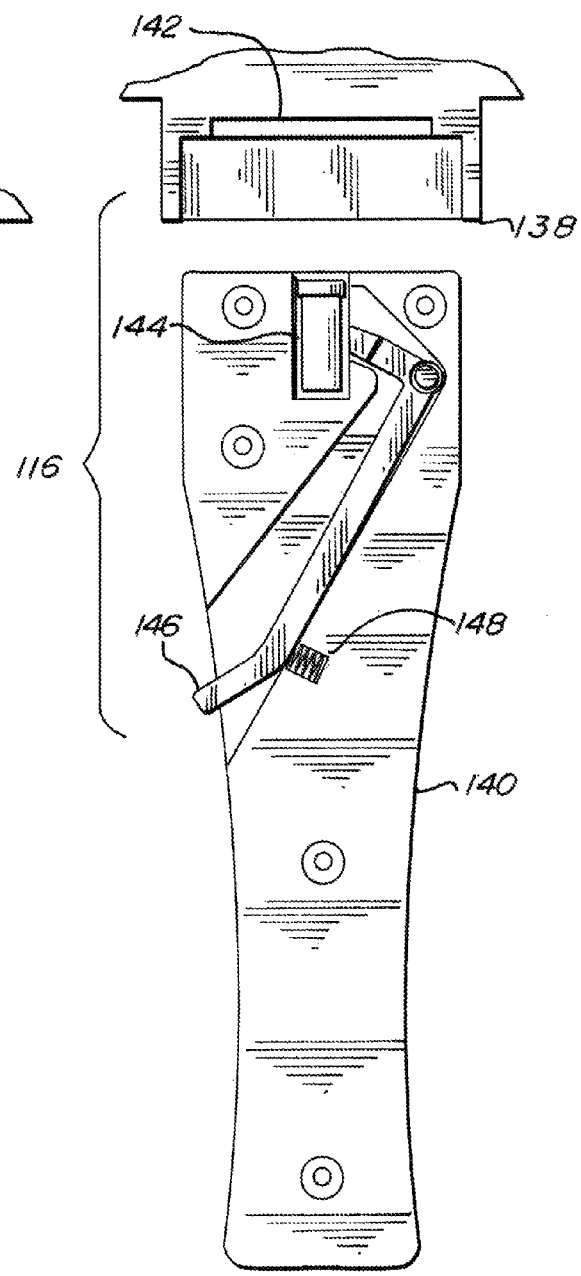
FIG. 17 is a top view of the removable pan handle of the appliance in its removed state.
Figure 16:
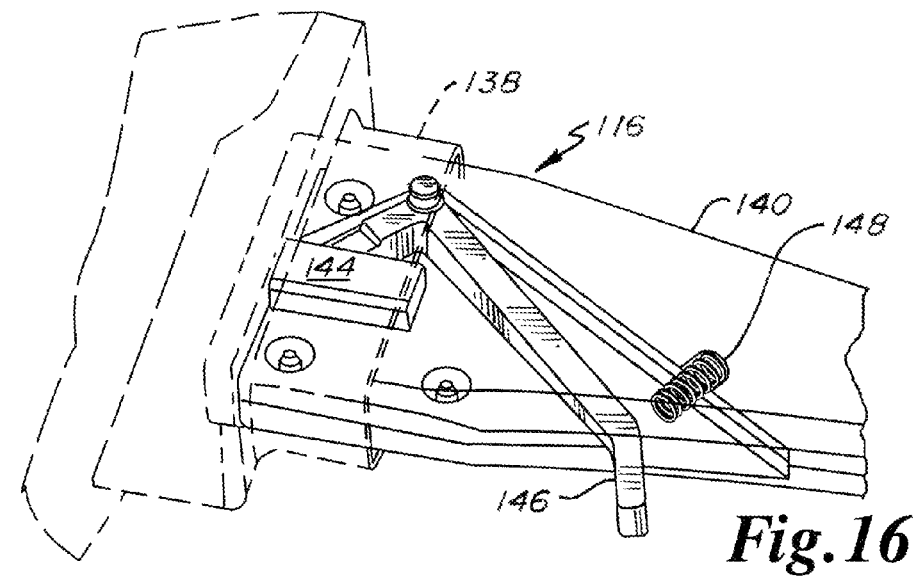
FIG. 16 is a perspective view of the removable pan handle of the appliance in its attached state.
Figure 18:
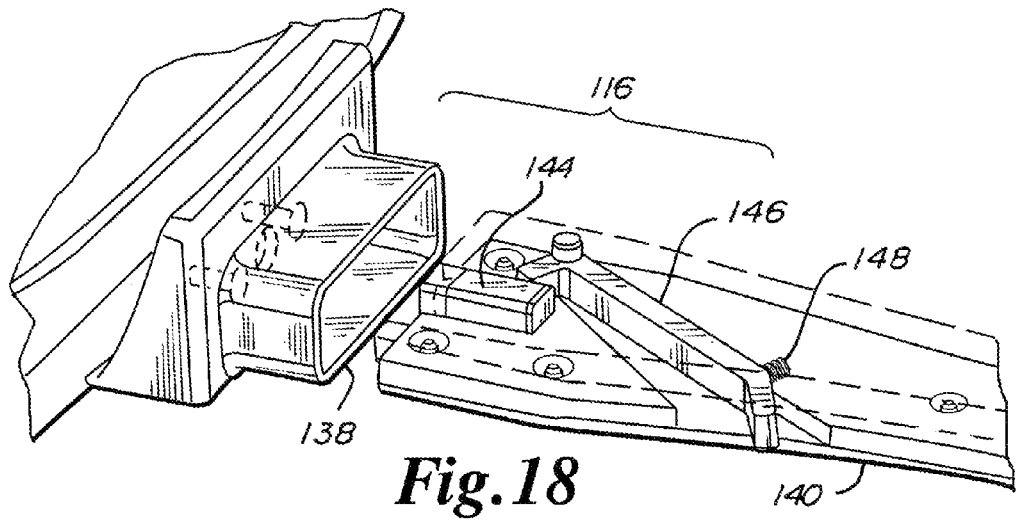
FIG. 18 is a perspective view of the removable pan handle of the appliance in its removed state.

While the main function of the apparatus is to provide rapid cooking of food placed in the enclosure it may also be used as two, side by side cooking surfaces, as seen in FIGS. 10 and 12. This cooking option can be used by hinging the enclosure open so that the top portion of the enclosure is laid on the countertop next to the bottom portion of the enclosure, thus exposing the two heating elements, permitting the user to place cooking pans on either or both of the heating elements.

The two heating elements may be executed as two sheathed electric heating rods configured in a manner that may optimize transferring heat through conduction to the food. The bottom heating element is configured to optimize the heat transfer to the bottom of the cooking pan. The upper heating element is located at a predetermined distance above the top of the food in the cooking pan and is configured to optimize transferring heat to the food through radiation. A lower metal shield 120 and an upper metal shield 124 are positioned between the lower and upper heating elements, respectively, and the adjacent lower and upper surfaces of the enclosure. These shields are configured to serve as heat reflectors, as heat insulating shields to lessen heating of the enclosure, as spill trays in case food spills during the cooking process.

The lower heating element proximate the base of the cooking pan provides for rapid heat transfer through convection from the bottom of the cooking pan to the food in contact with it. The heat then travels through conduction through the food to heat the interior of the food. The source of heat above the food heats the upper surface of the food through radiation; once the upper surface of the food is heated; heat then travels through conduction through the food to heat the interior of the food. It has been found through experiments that to optimize cooking of different types of food stuff and following different recipes would require different degrees of heating energy from the lower and the upper heating elements.

Figure 19:
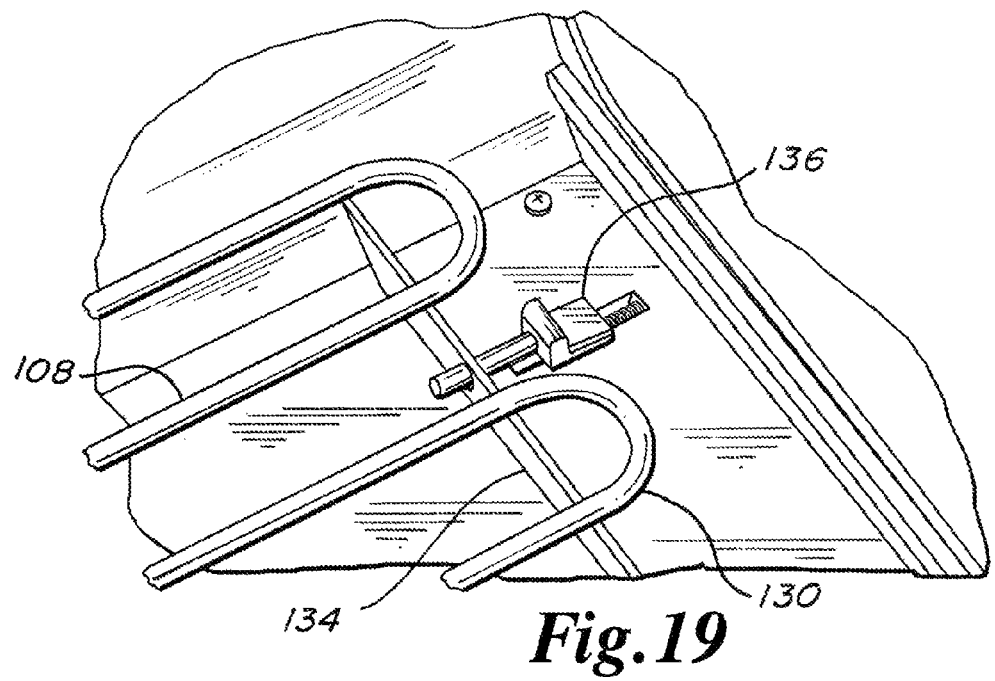
FIG. 19 is a perspective view of the upper heating element of the appliance in its latched state.
Figure 20:
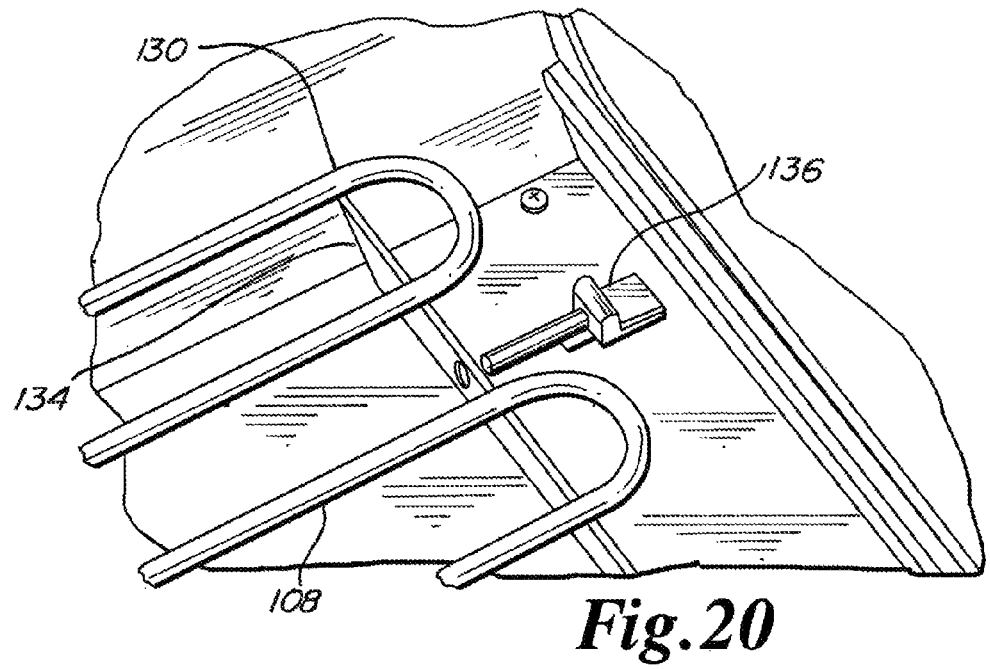
FIG. 20 is a perspective view of the upper heating element of the appliance in its unlatched state.

Referring to FIGS. 8, 9, 19, and 20, each of the two heating elements are plugged into electric connectors, upper connector 126 and lower connector 128, to enable their removal by the user as needed, such as for replacement or to facilitate cleaning of the shields. The heating elements are assemblies of heating element rods 130 configured in a meandering shape and supporting cross bars 134 made of metal that can sustain the temperature of the heating rods. These bars engage the shields to secure the heating elements in place. To further secure the upper heating element to the upper shield, a spring loaded latch 136 is provided which engages one of the cross bars, as seen in FIG. 19. The latch has to be pulled back manually, as in FIG. 20, in order to allow the heating element to be disengaged from the upper connector and removed from the appliance. Such a spring loaded latch may also be incorporated by the lower heating element, if desired.

The cooking pan 116 is a generally square frying pan with rounded corners and sloping sides. It may be coated with a non-stick coating of one sort or another. It further features a rectangular tubular receiver 138 configured to receive the pan end of removable handle 140, as shown in FIGS. 15-18. The pan end of the handle has a rectangular front portion configured to slide into the rectangular opening of the appendage and to fit tightly there-within. The closed inner end of the rectangular opening includes a paramagnetic steel plate 142, whereas the end of the handle includes a permanent magnet 144 positioned to engage the plate, in order to help secure the handle to the cooking pan as in FIGS. 15 and 16.

Figure 2:
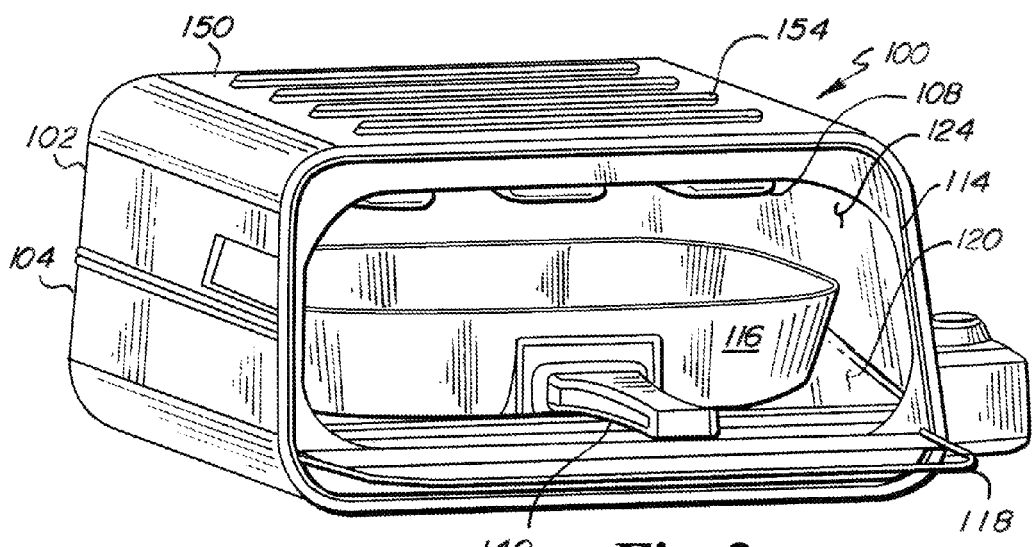
FIG. 2 is a perspective view of the appliance with its front door opened and the pan inserted.
Figure 3:
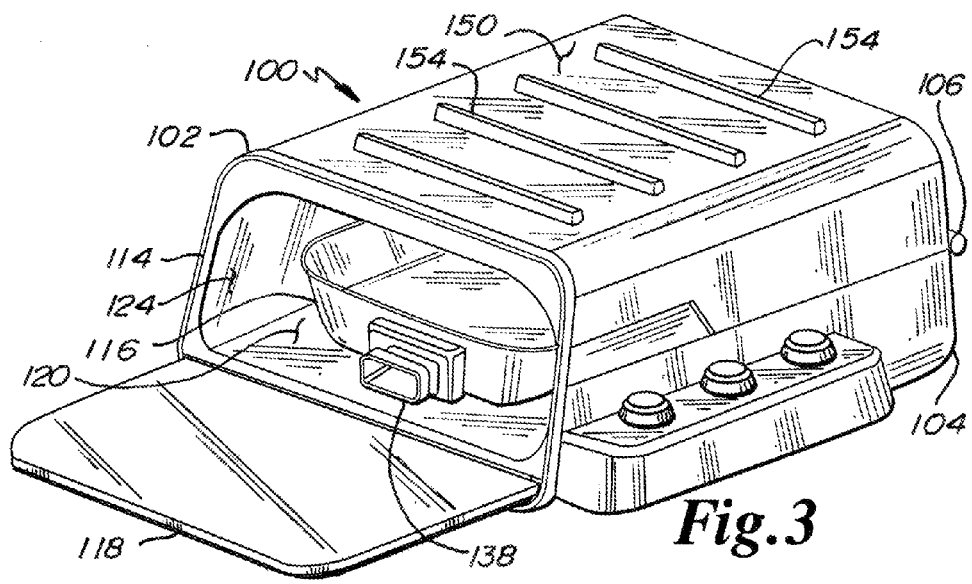
FIG. 3 is a perspective view of the appliance with its front door opened, the pan inserted, and the pan handle removed.
Figure 4:
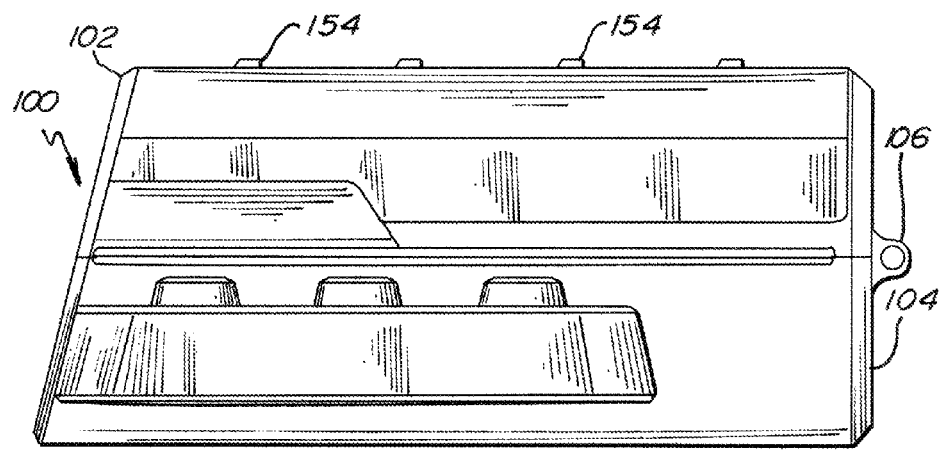
FIG. 4 is a side view of the appliance.
Figure 5:
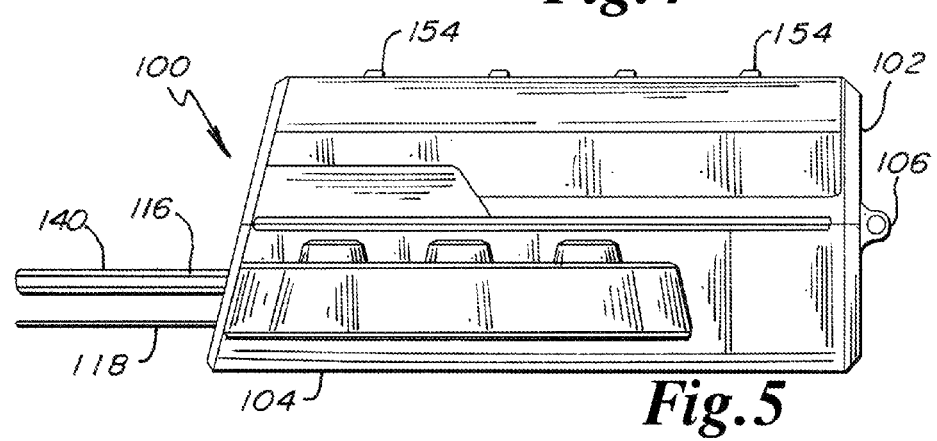
FIG. 5 is a side view of the appliance with its front door opened.
Figure 6:
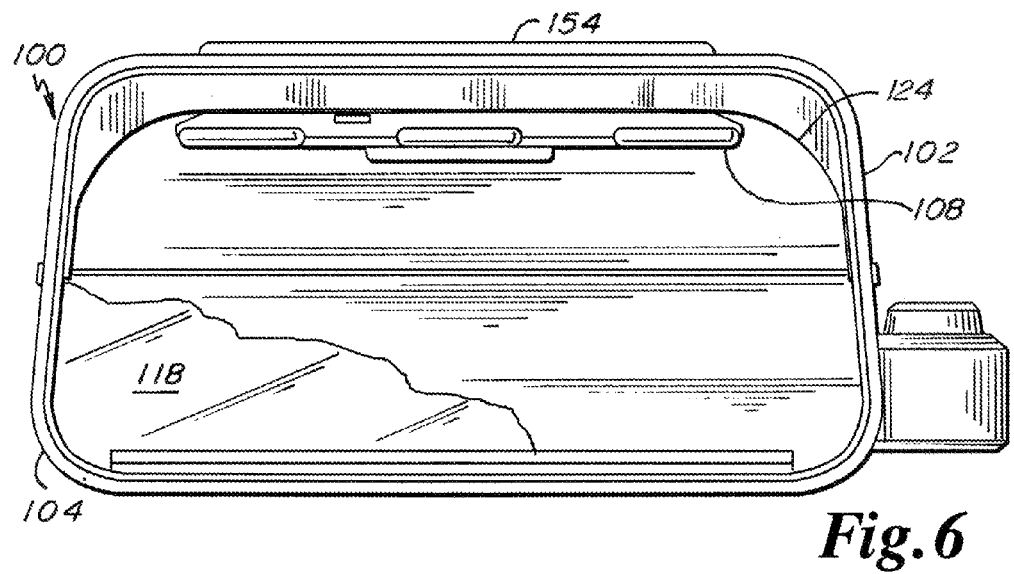
FIG. 6 is a front view of the appliance.
Figure 7:
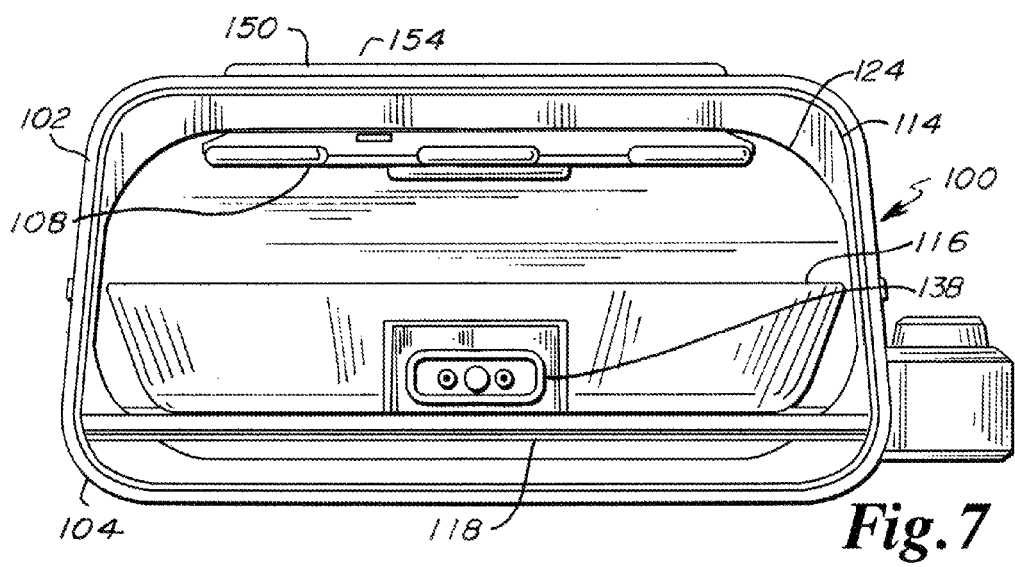
FIG. 7 is a front view of the appliance with its front door opened.
Figure 8:
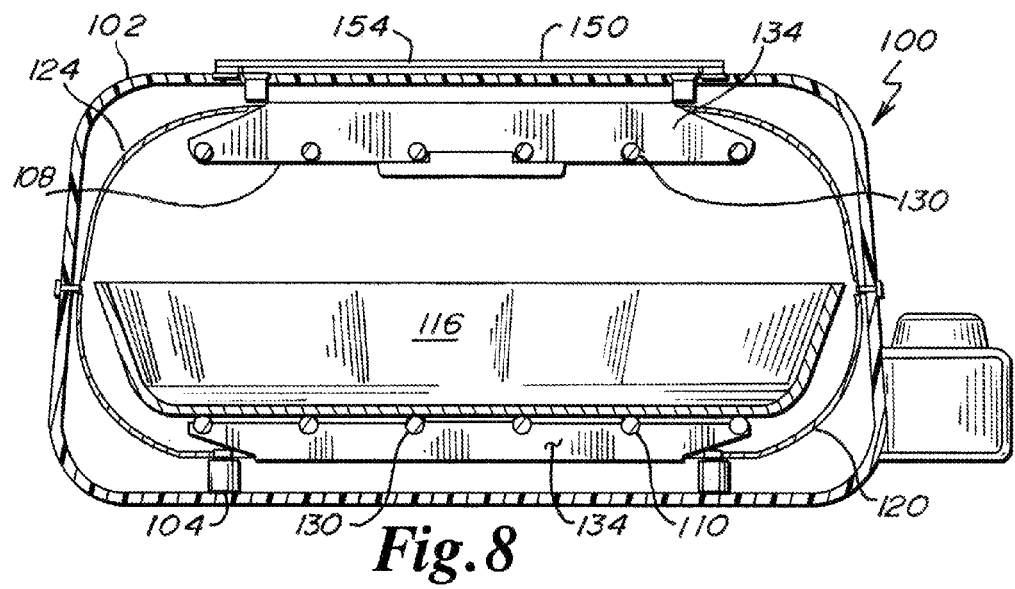
FIG. 8 is a cross-sectional front view of the appliance.
Figure 9:
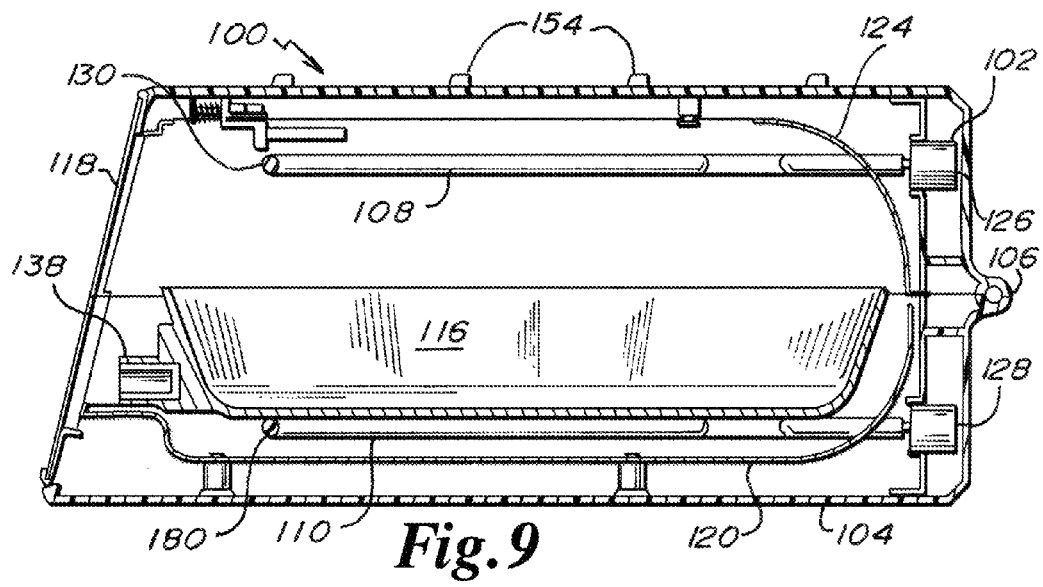
FIG. 9 is a cross-sectional side view of the appliance.

The removable handle is used to slide the cooking pan in and out of the cooking enclosure as seen in FIG. 2. However, once the cooking pan is in place for cooking, the handle must be removed as seen in FIG. 3 to allow door 118 to close during the cooking process. To disengage the handle the user pushes the extended lever 146 on the side of the handle as in FIGS. 17 and 18. The lever provides sufficient mechanical advantage to force the magnet away from the paramagnetic plate to a distance where the magnetic force is substantially minimized, allowing the handle to be pulled from the cooking pan. Spring 148 forces the lever back out of the side of the handle when the lever is release.

The employment of the metal shields helps in protecting most of the outer enclosure of the appliance from being exposed to high temperatures, therefore most of the enclosure may be molded of plastic material with thermal properties that withstand temperatures of around 100 C. However, the top of the upper housing portion is exposed to the rising heat within the cooking chamber and the temperature it realizes during the cooking process is found to exceed 100 C, requiring that portion of the housing to be made of a metal plate 150, preferably made of aluminum, steel, or stainless steel. To allow heat that builds up between the shield and the metal plate to escape requires that the metal plate be vented or perforated. Such vents employ a series of elongated outwardly projecting ribs 154 with openings located therealongside. The upwardly projecting ends of the ribs are coplanar and create a horizontal surface which may be used to support a dish where food is to be kept warm. The ribs also serve as feet to suspend the upper portion from a countertop when the appliance is used in the open position of FIGS. 10 and 12.

Figure 13:
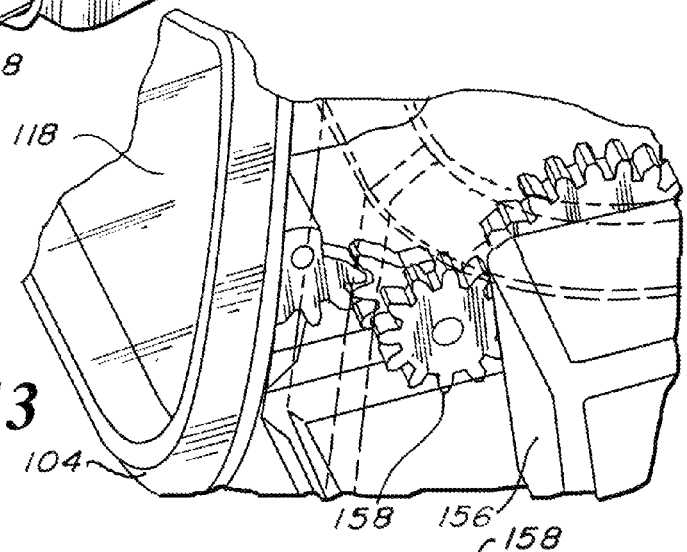
FIG. 13 is a close-up perspective view of the gear system of the appliance in its door-closed state.
Figure 14:
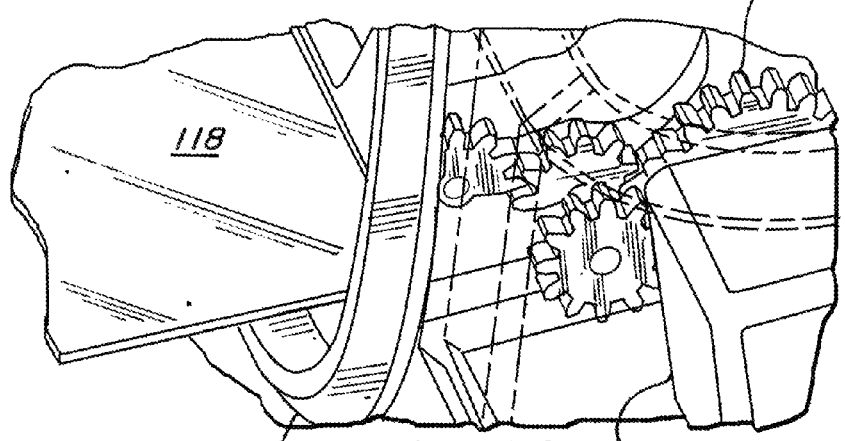
FIG. 14 is a close-up perspective view of the gear system of the appliance in its door-opened state.
Figure 11:
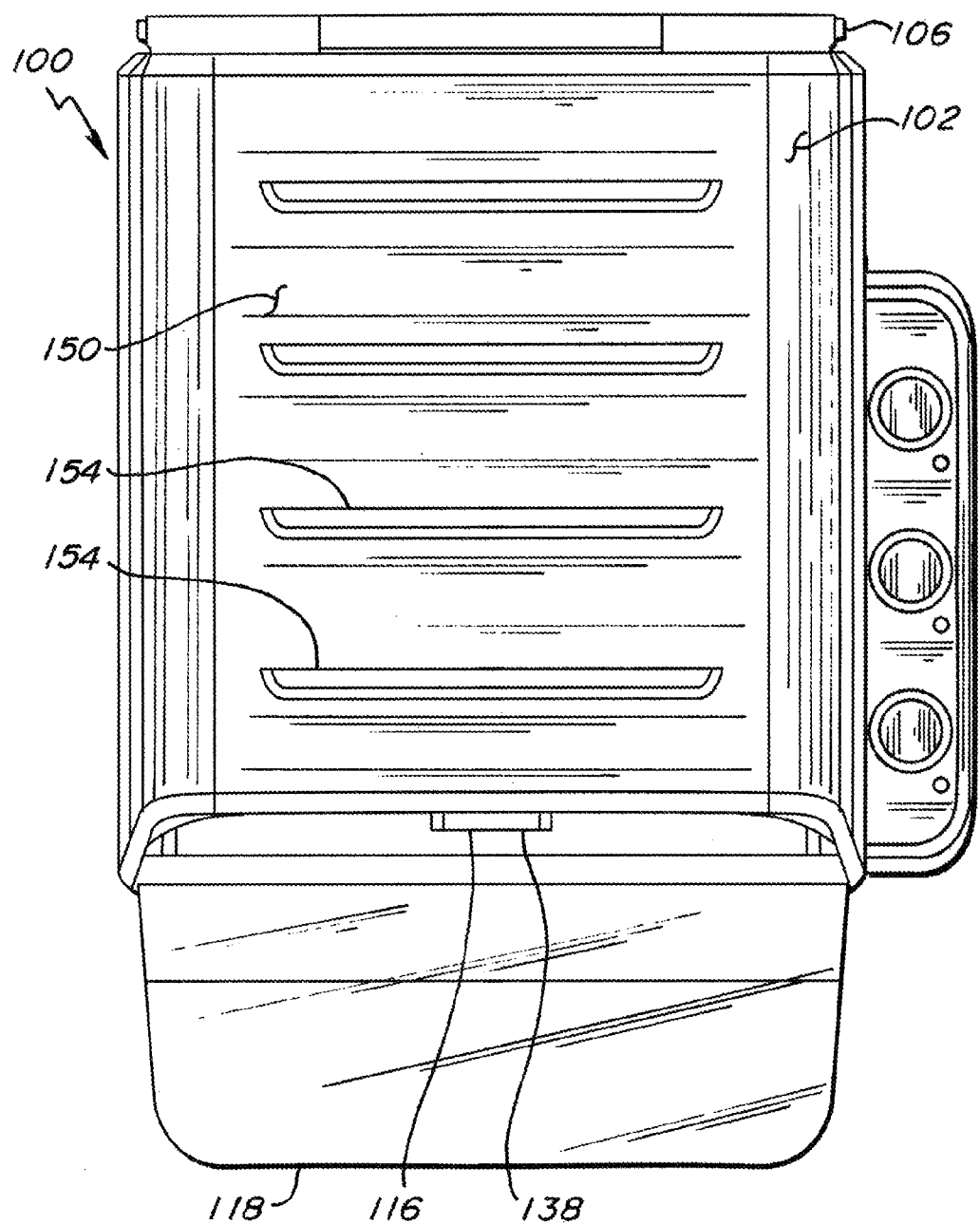
FIG. 11 is a top view of the appliance.

Door 118 may be opened manually, but is also adapted to be opened and closed electrically, using a permanent magnet DC gear motor 156 and gear train 158, as shown in FIGS. 13 and 14. The gear motor may be operated by the user or be programmed to close and open as part of a control circuit, such as by time or when a selected temperature is realized. One or more sensors, in the form of limit switches, reed switches, or other means well known in the art, may be employed to communicate to the programmable controller that the door is fully opened and/or closed.

The heating elements may be controlled manually, such as by knobs or switches, or programmed, using such control means as a touch-screen or control buttons, as determined to be most suitable, without deviating from the intent of the invention. The programmable controller is capable of causing different heating levels within the cooking chamber in accordance with a recipe program or such.

While the invention has been shown and described with reference to specific exemplary embodiments, it should be understood by those skilled in the art that various changes in form and detail may be made without departing from the spirit and scope of the invention, and that the invention should therefore only be limited according to the following claims, including all equivalent interpretation to which they are entitled.

The invention claimed is:

1. A counter top cooking appliance having an enclosure defining a cooking chamber arranged to receive a cooking pan, wherein the cooking chamber comprises a lower heating element arranged so that the cooking pan may be supported thereon to receive conductive heating there-from, and an upper heating element disposed above and spaced from the cooking pan to provide radiant heating to food there-within;
   wherein the enclosure comprises an upper portion including the upper heating element, and a lower portion including the lower heating element, and a hinge connecting the upper portion to the lower portion disposed a fixed vertical distance below the upper heating element; the hinge enabling the upper portion to rest atop the lower portion to define the cooking chamber, and alternatively enabling the upper portion to be swung relative to the lower portion so that the upper and lower portions are in a parallel side-by-side relationship and both heating elements are arranged so that the cooking pan may be supported on either thereof to receive conductive heating there-from, or so that two cooking pans may be supported there-on to receive conductive heating there-from; and
   wherein the upper and lower heating elements are arranged to selectively allow different heating levels both when the upper portion is resting atop the lower portion and when the upper and lower portions are in the parallel side-by-side relationship.

2. The appliance of claim 1 wherein at least one of the heating elements is selectively controllable to cause the different heating levels.

3. The appliance of claim 2 further comprising a programmable controller to cause the different heating levels in accordance with a recipe program.

4. The appliance of claim 3 wherein the programmable controller causes different temperatures according to accumulated time and/or measured temperature.

5. The appliance of claim 3 further comprising a manual controller for use instead of or in conjunction with the programmable controller.

6. The appliance for claim 3 further comprising a door openable to allow insertion of the cooking pan into and removal of the pan from the cooking chamber, and closeable during cooking to retain heat within the cooking chamber.

7. The appliance of claim 3 wherein the door is automatically openable by the programmable controller.

8. The appliance of claim 7 wherein the programmable controller causes the door to open according to accumulated time and/or measured temperature.

9. The appliance of claim 8 wherein the cooking pan comprises a handle for enabling placement of the cooking pan into the cooking chamber; the handle being detachable from the cooking pan to enable closure of the door during cooking.

10. The appliance of claim 9 wherein the handle is re-attachable to the cooking pan for removal of the cooking pan from the cooking chamber.

11. A counter top cooking appliance having an enclosure defining a cooking chamber including a heating element; a programmable controller to energize the heating element in accordance with a recipe program, and a door openable to allow insertion of food into and removal of the food from the cooking chamber, and closeable during cooking to retain heat within the cooking chamber; wherein the door is automatically openable by the programmable controller; and wherein the enclosure comprises an upper portion including an upper heating element, and a lower portion including a lower heating element, and a hinge connecting the upper portion to the lower portion disposed a fixed vertical distance below the upper heating element; the hinge enabling the upper portion to rest atop the lower portion to define the cooking chamber, and alternatively enabling the upper portion to be swung relative to the lower portion so that the upper and lower portions are in a parallel side-by-side relationship and both heating elements are arranged so that the cooking pan may be supported on either thereof to receive conductive heating there-from, or so that two cooking pans may be supported there-on to receive conductive heating there-from; and wherein the upper and lower heating elements are arranged to selectively allow different heating levels both when the upper portion is resting atop the lower portion and when the upper and lower portions are in the parallel side-by-side relationship.

12. The appliance of claim 11 wherein the programmable controller causes the door to open according to accumulated time and/or measured temperature.

13. The appliance of claim 11 wherein the programmable controller causes different heating levels within the cooking chamber in accordance with the recipe program.

14. The appliance of claim 13 wherein the programmable controller causes the door to open according to accumulated time and/or measured temperature.

15. The appliance of claim 11 wherein the door is openable and closeable electro-mechanically.

16. The appliance of claim 15 wherein the door is openable and closeable by a permanent magnet DC electric motor and a gear train.

17. The appliance of claim 16 wherein the permanent magnet DC electric motor is controlled by the programmable controller.

18. The appliance of claim 17 further comprising a sensor for communicating with the programmable controller when the door is opened and/or closed.

* * * * *